United States Patent [19]

Di Franco

[11] Patent Number: 5,041,199

[45] Date of Patent: Aug. 20, 1991

[54] PROCESS FOR PRODUCING ELECTRODEPOSITED ELECTRODES FOR USE IN ELECTROCHEMICAL CELLS

[75] Inventor: Dino F. Di Franco, Mayfield Village, Ohio

[73] Assignee: Gould Inc., Eastlake, Ohio

[21] Appl. No.: 503,996

[22] Filed: Apr. 4, 1990

[51] Int. Cl.$^5$ .............................................. C25D 15/00
[52] U.S. Cl. .................................. 204/181.5; 204/2.1; 204/16; 204/56.1; 204/181.4; 429/217; 429/218; 429/224
[58] Field of Search ............. 204/2.1, 16, 56.1, 181.4, 204/181.5, 181.6, 181.7; 429/217, 218, 224

[56] References Cited

U.S. PATENT DOCUMENTS

| | | | |
|---|---|---|---|
| 3,531,391 | 9/1970 | Palaika | 204/181.4 |
| 3,585,119 | 6/1971 | Schneider et al. | 204/181.5 |
| 3,594,339 | 7/1971 | Palaika | 204/181.4 X |
| 3,929,504 | 12/1975 | Gore et al. | 429/218 X |
| 3,945,898 | 3/1976 | Tsuji et al. | 204/181.4 |
| 3,962,165 | 6/1976 | Bosso et al. | 260/29.2 |

FOREIGN PATENT DOCUMENTS 1230774 12/1966 Fed. Rep. of Germany .
2347147  4/1974 Fed. Rep. of Germany .

OTHER PUBLICATIONS

"Fundamental Aspects of Electrodeposition of Paint", Fritz Beck, Process in Organic Coatings, 4 (1976), pp. 1–60.
The Chemistry of Binders for Electrodeposition, Hans Uwe Schenck et al., Progress in Organic Coatings, 7 (1979), pp. 1–77.
Electrodeposition of Paint in Carbon Black Filled Systems, Fritz Beck et al., J. Electrochem. Soc., Electrochemical Science and Technology, Oct. 1987, pp. 2416–2424.
Electrodeposition of Polymer Coatings, Fritz Beck, Electrochimica Acta., vol. 23, No. 7, pp. 839–850, 1988.

*Primary Examiner*—John F. Niebling
*Assistant Examiner*—William T. Leader

[57] ABSTRACT

A process whereby an aqueous solution containing an electrodepositable electrolyte, such as a resin or surfactant solution, is utilized as an electrolyte bath in which particles of an electrode material, such as manganese dioxide along with particles of carbon are dispersed within the bath so that when a voltage is applied across a conductive substrate and the bath, the particles will be deposited on the substrate to produce an electrode suitable for use in electrochemical cells.

25 Claims, No Drawings

PROCESS FOR PRODUCING ELECTRODEPOSITED ELECTRODES FOR USE IN ELECTROCHEMICAL CELLS

FIELD OF THE INVENTION

The invention relates to a method for producing electrodes for use in electrochemical cells using electrodeposition techniques.

BACKGROUND OF THE INVENTION

Electrochemical cells have found wide use as the power source for operating industrial and consumer articles, both stationary and portable. With the advent of packaging articles as small as practical, the pressure has been placed on the battery industry to produce smaller and more powerful cells to be packaged with such articles. The cylindrical cell construction has been in use almost since the inception or introduction of the electrochemical cell into the market. This type of construction was followed by miniature button type cells, flat cells and odd shaped cells designed for specific applications.

With the advent of smaller portable devices such as cameras, radios, televisions and similar type electronic appliances, ultra-thin, high-energy batteries have found wide acceptance. With high energy density, high capacity lithium cells having a flat discharge, and a shelf life of more than five years, the advanced technology of lithium planar batteries expands the potential of product design and performance. Applications already utilizing the planar battery include such devices as cardiac monitors and thermometers, industrial equipment life gas flowmeters, hand-held computers and radio transmitters, and consumer products from pocket TVs to electronic scales.

All batteries are composed of a positive electrode, a negative electrode and an electrolyte. Cathodic electrodes, such as manganese dioxide, are generally fabricated by preparing a slurry containing the manganese dioxide and then forming it into a shaped electrode or spreading it on a surface of a current collector to form a thin film electrode.

Since the introduction of the electrodeposition process for painting metal objects in the early 1960's, the process has been adapted world wide in the automotive industry and the appliance industry to coat a variety of products. A detailed description of this process can be found in the following articles:

(1) "Review Article Electrodeposition of Polymer Coatings" by Fritz Beck in Electrochemica Acta. Vol. 33 No. 7 pp 839 to 850, 1980;
(2) "Electrodeposition of Paint in Carbon Black Filled Systems" by Fritz Beck and Harold Guder in J. Electrochem. Soc. Electrochemical Science and Technology Vol. 134 No. 10 pp 2416 to 2424, 1987; and
(3) "The Physical Chemistry of the Cathodic Electrodeposition Process" by Percy E. Pierce in Journal of Coating Technology Vol. 53, No. 672, January 1981.

The references are incorporated herein as if they were presented in their entirety.

It is an object of the present invention to use electrodeposition technology to provide a process for producing electrodeposited electrodes for use in electrochemical cells.

It is an object of the present invention to provide a process for producing electrodeposited cathodic electrodes for use in electrochemical cells.

It is another object of the present invention to provide a process for making planar geometry electrodes using electrodeposition techniques.

It is another object of the present invention to produce manganese dioxide planar geometry electrodes using electrodeposition techniques.

The foregoing and additional objects will become fully apparent from the following description.

SUMMARY OF THE INVENTION

The invention relates to a process for producing an electrodeposited electrode for use in electrochemical cells comprising the steps:

a) preparing an aqueous solution with an electrodepositable electrolyte and at least one type of particulate electrode material to form a dispersion of said particulate electrode material in said aqueous solution;

b) contacting a conductive substrate with the aqueous solution containing the dispersion of particulate electrode material; and c) applying a voltage across the conductive substrate and aqueous solution causing the particulate electrode material to be deposited on the conductive substrate.

Preferably the electrode material could be particulate cathodic material, such as manganese dioxide along with particulate carbonaceous material, such as carbon or graphite. In some applications poly(ethyleneoxide) (PEO) could also be deposited along with the electrode material for use in a particular type cell system.

As used herein an electrolyte is a substance that dissociates into two or more ions in water. Solutions of electrolytes thus conduct an electric current and can be decomposed by an electric current (electrolysis). Generally for use in this invention the electrolyte could be a flotation agent, an emulsion agent, a resin or a surfactant that behaves as a polyelectrolyte which is solubilized in water to produce an electrolytic bath for an electrodeposition process. Although not wanting to be bound by theory, it is believed that the electrolyte (for example a resin or surfactant) when dispersed in the aqueous solution acquires a positive charge so that when a potential is applied across the substrate and solution; the resin or surfactant migrates toward the negative plate (conductive substrate). However, before applying the potential across the substrate and the solution, it is believed that the electrolyte, such as a resin or a surfactant, molecules surrounds or encapsulates the dispersed particles of the electrode material so that with an application of an appropriate potential across the conductive substrate and aqueous solution, the resin or surfactant molecule along with the particles of the electrode material will migrate towards the conductive substrate and be deposited on the surface. It is believed that the deposition is not a classical deposition, but a deposition that is caused by the resin or surfactant picking up an electron and/or falling out of solution due to an increase in pH at the negative plate. Specifically, the pH at the negative plate is increased because hydrogen evolution removes hydrogen ions from the solution, thus increasing the pH of the solution at the negative plate.

It is also possible that the electrolyte molecules form a positive charge and when capturing, surrounding or encapsulating the electrode particles form colloidal type particles that migrate to the conductive substrate under the influence of an appropriate potential. This mass transportation of the positive colloidal particles is called electrophoresis. In either approach, the positive charged electrolyte, such as resin or surfactant particles are believed to capture or attract the electrode particles and carry them to the conductive substrate under the influence of an appropriate applied potential.

The electrolyte, such as a resin or a surfactant, for use in this invention has to be one that is dissociated into two or more ions even at moderate dilutions and has to produce positive charged molecules that can surround, encase or otherwise capture the electrode particles, such as cathode electrode particles and carbonaceous particles. Thus under the influence of an applied potential, the cathodic and carbonaceous particles can migrate to the conductive substrate (negative plate) and be deposited on said conductive substrate.

Examples of suitable resins for use in this invention are water-dispersible quaternary ammonium resins of the types disclosed in U.S. Pat. No. 3,962,165 and electrodepositable epoxies. The disclosure of U.S. Pat. No. 3,962,165 is incorporated herein as if it were presented in its entirety. Suitable surfactants are cationic or amphoteric surfactants such as salts of the n-alkyl amines, quaternary ammonium surfactants and polyamine surfactants. A suitable electrolyte would be an epoxy-group containing resin with an amine. An acid such as $H_2SO_4$, $Na_2SO_4$ or $K_2SO_4$ could be added to the electrolyte to render the resin water dispersible and electrodepositable. Suitable epoxy resins are polyglycidal ethers of polyhydrin phenols, such as diglycidyl ether of bisphenol A. Suitable amines are monoamines, particularly hydroxyl-containing amines. Tertiary and secondary amines would be preferred to primary amines. Examples of suitable amines are alkanolamines, dialkanolamines, trialkanolamines, alkylalkanolamines, arylalkanolamines, arylalkylalkanolamines, alkylamines, ethanolamine, n-methyl ethanolamine, diethanolamine, n-phenylethanolamine, n, n-dimethylethanolamine, n-methyldimethanolamine, triethanolamine, ethylamine, propylamine, triethylamine, diethylamine, and the like. Suitable acids are formic acid, acetic acid and lactic acid.

The particulate electrode material should preferably be sized at about 50 microns or less, preferably about 20 microns or less and most preferably about 10 microns or less. Examples of suitable electrode materials would include manganese dioxide ($MnO_2$), carbon monofluoride, vanadium pentoxide, metal chromate such as silver chromate and silver bismuth chromate; metal oxide such as nickel oxide, lead oxide, bismuth lead oxide and copper oxides; sulfides such as copper sulfides and iron sulfides; and cadmium.

Particulate carbonaceous material, if used, should preferably be carbon sized at about 50 microns or less, preferably about 20 microns or less and most preferably about 10 microns or less. The preferred carbonaceous material is acetylene black or furnace black. With the conductive carbon in the dispersion, deposited electrode material and carbon mixture produces a conductive deposited layer on the substrate. Thus the electrodeposition process can continue until any desired buildup of the deposited electrode is obtained. Thus since one of the components of the deposited layer is an electronic conductor (carbon), the deposited layer can maintain the electric circuit continuously and thereby enables the deposit of a cathodic electrode and carbon mixture to continue to any desired thickness. Without the particulate carbon, the deposition of an unconductive electrode material would cease when the applied voltage equaled the voltage drop across the deposited material.

Preferably, the conductive substrate onto which the electrode containing material is deposited should be a current collector for the intended cell where the deposited electrode is to be used. For planar geometry type cells, the conductive substrate could be a sheet of copper which could function as the cathode current collector of the cell. Other suitable substrates would be nickel, stainless steel, brass and aluminum.

A procedure for producing cathode electrodes utilizing an electrodepositable resin could involve the following steps:

a) blending and ball milling together particulate carbon and particulate electrode material such as manganese dioxide in a ratio of carbon to manganese dioxide of 1 to 40;

b) preparing a resin and acid mixture by adding an acrylic resin such as obtained under the tradename K5268 from the Glidden Company with an acid such as a lactic acid in which the acid is added to render the resin water dispersible;

c) adding the particulate electrode material and particulate carbon to the resin-containing mixture of step b) and if necessary, adding a solvent, such as methyl ethyl ketone, to lower the viscosity of the solution so that the mixture can be easily dispersed; and d) dispersing the mixture of step c) into water to produce an electrodeposition bath containing the electrode particles and the carbon particles. In step c, if the solvent is used, the dispersion could be ball milled again to ensure that the particles are appropriately blended throughout the solution and then the solvent can be evaporated.

The electrodeposition bath could comprise 1 percent to 20 percent resin, 0.5 percent to 4 percent electrode material and 0.5 percent to 4 percent carbon as based on the weight of the solid components of the electrodeposition bath.

A specific electrodeposition bath could comprise about 24 grams of $V_6O_{13}$/carbon mixture in a ratio of 18 to 1 of $V_6O_{13}$ to carbon; about 18 grams resin; and about 4 grams of lactic acid in a 100 ml aqueous solution.

A procedure for producing cathode electrodes utilizing an electrodepositable surfactant could involve the following steps:

a) blending and ball milling together particulate carbon and particulate electrode material, such as manganese dioxide, in a ratio of 1 to 40 of carbon to manganese dioxide;

b) preparing an aqueous solution containing from 0.1 weight percent to 5 weight percent of a cationic or amphoteric surfactant and maintaining the pH of the solution at about 4 to 6 by adding $H_2SO_4$; and c) adding the milled blend of particles in step a) to a desired concentration of the surfactant solution and blending the solution under high shear to disperse the particles in the solution.

A typical electrodeposition bath would be about 0.1 weight percent surfactant and about 1 weight percent mixture of carbon and electrode material in an aqueous solution with the ratio of carbon to electrode material being from 1 to 40.

When using an electrodepositable resin or surfactant of this invention, the applied potential for the bath can be set at any voltage such as between 10 to 60 volts. The rate of deposition will increase as the voltage increases.

EXAMPLE 1

An electrodeposition resin bath was prepared as discussed above which yielded a composition of 18.5 grams of an acrylic resin (K5268 resin); 24 grams of a mixture of $V_6O_{13}$ and carbon in a weight ratio of $V_6O_{13}$ to carbon of 18:1 and 4 grams lactic acid in an aqueous solution of 100 milliliters (ml).

The aqueous solution was placed in a 150 ml beaker and a copper sheet was used as the conductive substrate (negative plate). A dimensionally stable anode made of irridium coated titanium was used as a counter electrode. The applied voltage was varied for the electrodeposition of the $V_6O_{13}$/carbon mixture onto the copper substrate. The active cathode area of the copper sheet was 0.89 square inch and the anode-cathode gap was 0.5 inch. The data of plating voltage, plating time, deposited coating; peak current and current at 65 seconds of the electrodeposition process are shown in table 1.

TABLE 1

| Sample Electrodes | Voltage (volts) | Plating Time (seconds) | Wt. Deposited (grams) | Peak Current (amperes) | Current at 65 second (amperes) |
|---|---|---|---|---|---|
| 1 | 10 | 65  | .045 | .077 | .042 |
| 2 | 10 | 130 | .057 | .082 | .053 |
| 3 | 10 | 260 | .070 | —    | —    |
| 4 | 20 | 65  | .093 | .18  | .08  |
| 5 | 40 | 65  | .131 | .38  | .18  |
| 6 | 60 | 65  | .266 | .53  | .37  |

EXAMPLE 2

Several manganese dioxide electrodes were made by first mixing carbon (c) and particulate manganese dioxide ($MnO_2$) together in a weight ratio of 1 to 39. Four (4) grams of the C/$MnO_2$ mixture were added to 2.0 liters of a 0.4 weight percent solution of a cationic surfactant obtained from Akzo Chemical Company under its trademark Armac #1336. The solution and mixture were homogenized in order to disperse the particles of the carbon and manganese dioxide in the solution. A copper sheet masked on its back side was placed into the solution as the cathode substrate (negative plate) of a flow through electrodeposition cell along with a stainless steel anode. The active cathode area of the copper sheet was 1.95 decimeters and the anode-cathode gap was 0.5 inch. Initially 1.5 liters of the mixture-containing solution was placed into the plating system and then after various depositions, additional amounts of the mixture-containing solution were added to replenish the materials that were deposited. The depositions were conducted at 30 volts for a period of two (2) minutes after the initial ph of the bath was set between 5 to 5.5. The average current, average ampere-minute on bath, average current density, pH after plating, and the weight and thickness of the deposited electrode are shown in Table 2. The initial pH of the bath was adjusted by adding $H_2SO_4$.

TABLE 2

| ELECTRODE SAMPLE | AVERAGE CURRENT (AMPS) | AVERAGE AMP-MIN ON BATH (AMP-MIN) | AV. CURRENT DENSITY (AMP/DM*DM) | pH AFTER PLATING | MASS DEPOSITED (GRAMS) | DEPOSITED THICKNESS (MILS) |
|---|---|---|---|---|---|---|
| 1   | 2.35 | 4.7   | 1.21 | 4.85 | 2.4  | 9.0  |
| 2   | 3.07 | 12.28 | 1.60 | 4.07 | 2.49 | 9.0  |
| 3   | 3.46 | 20.76 | 1.77 | 3.2  | 2.55 | 9.0  |
| 4*  | 4.56 | 36.48 | 2.34 | 3.2  | 1.73 | 6.0  |
| 5*  | 5.49 | 54.9  | 2.79 | 3.05 | 1.03 | 4.75 |
| 6*  | 5.87 | 70.44 | 3.02 | 3.05 | .54  | 1.00 |
| 7** | 5.13 | 71.82 | 2.62 | 3.12 | 1.65 | 7.00 |

*added 100 milliliters to the bath solution
**added 200 milliliters to the bath solution To provide a continuous process for producing deposited electrodes would entail using a reservoir to supply a continuous addition of the bath solution to the plating cell, a method of controlling the pH of the bath solution to a range between 4 to 6 and possibly an in-line homogenizer pump to agitate the bath solution to insure an adequate dispersion of the particulate electrode material throughout the bath solution. Possible ways of controlling the pH of the bath solution are: (a) placing an anion exchange membrane around the anode during electrodeposition to prevent the hydrogen ion rich solution from mixing with the bulk solution; (b) adding NaOH or other suitable material to the solution to maintain the solution pH; and (c) using an (ultrafilter) to remove the acid from the bath. An ultrafilter is a dense filter that is used for the filtration of a colloidal solution that holds back the dispersed particles but not the liquid.

EXAMPLE 3

A sample electrode made as described in Example 2 for electrode Sample 2 was used as a manganese dioxide ($MnO_2$) electrode for an electrochemical cell. The copper substrate was the current collector for the cell and had an adhesive coated frame on a peripheral portion so that the $MnO_2$ and carbon were deposited only on the area within the frame. The backside of the current collector was masked with Teflon (Teflon is a trademark of DuPont Corporation for polytetrafluoroetylene) tape during plating so that none of the manganese dioxide and carbon were deposited on the backside. After plating, the Teflon tape was removed exposing the copper surface which served as a terminal for the cell. Two drops of an ethylene carbonate and propylene carbonate mixture was applied to the exposed surface of the deposited manganese dioxide electrode contained within the adhesive frame. A thin piece of a solid electrolyte (separator) was placed on top of the manganese dioxide electrode within the adhesive frame. The composition of the solid electrolyte was:

3.0 grams of a complex of poly(ethyleneoxide)
0.12 grams of a lithium salt, LiClO$_4$
4.5 grams of ethylene carbonate
0.74 gram of propylene carbonate A 1.5 mil thick piece of lithium was placed on top of the solid electrolyte, followed by a sheet of copper approximately the same size as the copper substrate. The cell was placed under pressure and heated to a temperature of about 300° F. so that the peripheral adhesive frame on the copper substrate was sealed to the peripheral edge portion of the top copper sheet thereby providing a sealed Li/MnO$_2$ cell. The small cell was discharged across a 75-ohm load and the voltage observed with time is shown in Table 3. The open circuit voltage was 2.9 volts.

TABLE 3

| Li/MnO$_2$ Cell Discharge | |
|---|---|
| Time (Minutes) | Voltage (volts) |
| 20 | 2.5 |
| 50 | 2.2 |
| 90 | 2.0 |
| 150 | 1.8 |
| 200 | 1.6 |
| 260 | 1.5 |
| 380 | 1.3 |
| 750 | 1.1 |
| 850 | 1.0 |

It is to be understood that modifications and changes to the preferred embodiment of the invention herein described can be made without departing from the spirit and scope of the invention.

What is claimed:

1. A process for producing an electrodeposited electrode for use in electrochemical cells comprising the steps:
   a) preparing an aqueous solution with an electrodepositable electrolyte comprising an electrodepositable resin or surfactant, a particulate carbonaceous material and at least one type of particulate cathodic electrode material to form a dispersion of said particulate cathodic electrode material and said particulate carbonaceous material in said aqueous solution;
   b) contacting a conductive substrate with the aqueous solution containing the dispersion of particulate cathodic electrode material and said particulate carbonaceous material;
   c) applying a voltage across the conductive substrate and aqueous solution causing the particulate cathodic electrode material and the particulate carbonaceous material to be electrodeposited on the conductive substrate; and
   d) assembling said electrodeposited cathodic electrode material and carbonaceous material along with an anode in an electrochemical cell.

2. The process of claim 1 wherein in step c) the aqueous solution is maintained at a pH of from about 4 to about 6.

3. The process of claim 1 wherein the particulate cathodic electrode material and the particulate carbonaceous material are sized at about 50 microns or less.

4. The process of claim 1 wherein the electrodepositable electrolyte is an electrodepositable resin.

5. The process of claim 4 wherein the electrodepositable resin comprises a water-dispersible quaternary ammonium resin.

6. The process of claim 4 wherein in step a) an acid mixture containing a solvent is added to the electrodepositable resin and then the particulate cathodic electrode material and particulate carbonaceous material are mixed therein after which the solvent is evaporated and the remainder is dispersed in water to produce the dispersion of particulate cathodic electrode material and particulate carbonaceous material in the aqueous solution.

7. The process of claim 6 wherein a voltage of from about 10 to 60 volts is applied across the conductive substrate and the aqueous solution.

8. The process of claim 1 wherein the conductive substrate is selected from the group consisting of copper, nickel, stainless steel, brass and aluminum.

9. The process of claim 8 wherein the conductive substrate is copper.

10. The process of claim 9 wherein the electrode material is selected from the group consisting of manganese dioxide, iron sulfides, copper sulfides, silver chromates, lead oxides, bismuth lead oxides, copper oxides, nickel oxides, carbon monofluoride, vanadium oxide and cadmium.

11. The process of claim 10 wherein the particulate cathodic electrode material and particulate carbonaceous material are sized 50 microns or less.

12. The process of claim 10 wherein the particulate electrode material is manganese dioxide and the particulate carbonaceous material is carbon.

13. The process of claim 10 wherein the particulate electrode material is V$_6$O$_{13}$ and the particulate carbonaceous material is carbon.

14. The process of claim 1 wherein the electrodepositable electrolyte is an electrodepositable surfactant.

15. The process of claim 14 wherein the electrodepositable surfactant is selected from the group consisting of cationic and amphoteric surfactants.

16. The process of claim 15 wherein in step a) an aqueous solution of the surfactant is prepared with a pH value of from 4 to 6 and then the particulate cathodic electrode material and particulate carbonaceous material are added to the aqueous surfactant solution to form the dispersion of particulate cathodic electrode material and particulate carbonaceous material in said aqueous surfactant solution.

17. The process of claim 16 wherein an acid is added to the surfactant solution to maintain the pH of the solution from 4 to 6.

18. The process of claim 16 wherein a material selected from the group consisting of H$_2$SO$_4$ and Na$_2$SO$_4$ and K$_2$SO$_4$ is added to the surfactant solution.

19. The process of claim 16 wherein a voltage of from 10 to 60 volts is applied across the conductive substrate and the aqueous solution.

20. The process of claim 16 wherein the substrate is selected from the group consisting of copper, nickel, stainless steel, brass and aluminum.

21. The process of claim 20 wherein the substrate is copper.

22. The process of claim 20 wherein the electrode material is selected from the group consisting of manganese dioxide, iron sulfides, copper sulfides, silver chromates, lead oxides, bismuth lead oxides, copper oxides, nickel oxides, carbon monofluoride, vanadium oxide and cadmium.

23. The process of claim 22 wherein the particulate cathodic electrode material and particulate carbonaceous material are sized 50 microns or less.

24. The process of claim 22 wherein the particulate electrode material is manganese dioxide and the particulate carbonaceous material is carbon.

25. The process of claim 22 wherein the particulate electrode material is $V_2O_{13}$ and the particulate carbonaceous material is carbon.

* * * * *